(12) United States Patent
Beyer, Jr.

(10) Patent No.: US 8,126,441 B2
(45) Date of Patent: Feb. 28, 2012

(54) METHOD OF ESTABLISHING A CELL PHONE NETWORK OF PARTICIPANTS WITH A COMMON INTEREST

(75) Inventor: Malcolm K. Beyer, Jr., Jupiter Inlet Colony, FL (US)

(73) Assignee: Advanced Ground Information Systems, Inc., Jupiter, FL (US)

( * ) Notice: Subject to any disclaimer, the term of this patent is extended or adjusted under 35 U.S.C. 154(b) by 809 days.

(21) Appl. No.: 11/615,472

(22) Filed: Dec. 22, 2006

(65) Prior Publication Data

US 2008/0076418 A1    Mar. 27, 2008

Related U.S. Application Data

(63) Continuation-in-part of application No. 11/308,648, filed on Apr. 17, 2006, now Pat. No. 7,630,724, and a continuation-in-part of application No. 10/711,490, filed on Sep. 21, 2004, now Pat. No. 7,031,728.

(51) Int. Cl.
*H04M 3/42* (2006.01)
*H04M 11/00* (2006.01)
*H04M 3/00* (2006.01)

(52) U.S. Cl. ...................... 455/414.2; 455/403; 455/420
(58) Field of Classification Search .................. 455/403, 455/420, 414.2
See application file for complete search history.

(56) References Cited

U.S. PATENT DOCUMENTS

| | | | |
|---|---|---|---|
| 7,593,740 B2 * | 9/2009 | Crowley et al. | 455/456.3 |
| 2003/0093405 A1 * | 5/2003 | Mayer | 707/1 |
| 2006/0030339 A1 * | 2/2006 | Zhovnirovsky et al. | 455/456.6 |
| 2006/0047825 A1 * | 3/2006 | Steenstra et al. | 709/229 |

* cited by examiner

Primary Examiner — Kamran Afshar
Assistant Examiner — Omoniyi Obayanju
(74) Attorney, Agent, or Firm — Malin Haley DiMaggio Bowen & Lhota, P.A.

(57) ABSTRACT

A method, a combined cellular, PDA communication device and system having specialized software applications for allowing a plurality of combined cellular phone/PDA device users to monitor each others' locations and status, to initiate cellular phone calls by touching a symbol on the touch screen display with a stylus which can also include point to call conferencing calling. Each participant's cellular phone/PDA device includes a GPS navigation receiver with application software for point to call cellular phone initiation to participants and geographical entities including vehicles, persons or events, conference calls and video transfers. The method, device and system also includes several features that allow each individual cell phone to poll the network participants to create a network of participants who have symbols displayed on each user's PDA display screen and providing application software in each cell phone with a server to allow individual users to create, by polling the network, a group of network participants having a common interest, or a network of friends and family for a network of all active participants. The method, device and system employed herein can also be used to establish an anonymous dating service that allows individual participants using their cell phones to identify and contact others for dating or social interaction without giving away their actual name and phone number.

8 Claims, 8 Drawing Sheets

METHOD OF ESTABLISHING A CELL PHONE NETWORK OF PARTICIPANTS WITH A COMMON INTEREST

This application is a continuation-in-part of U.S. patent application Ser. No. 11/308,648 filed Apr. 17, 2006 which is a continuation-in-part of U.S. patent application Ser. No. 10/711,490 now U.S. Pat. No. 7,031,728.

BACKGROUND OF THE INVENTION

1. Field of the Invention

A communications system using a plurality of cellular phones each having an integrated PDA and GPS receiver for the management of two or more people through the use of a communications network. The method and system provide each user with an integrated handheld cellular/PDA/GPS/phone that has advanced communication software application programs (hereinafter referred to as ACS) and databases used in conjunction with a remote server that enable a user to establish a cell phone network of cell phone participants having a common interest or relationship.

2. Description of Related Art

The purpose of a communications system is to transmit information bearing digital messages from a source, located at one point, to a user destination, located at another point some distance away. A communications system is generally comprised of three basic elements transmitter, information channel and receiver. One form of communication in recent years is cellular phone telephony. A network of cellular communication systems set up around an area such as the United States allows multiple users to talk to each other, either on individual calls or on group calls. Some cellular phone services enable a cellular phone to engage in conference calls with a small number of users. Furthermore, cellular conference calls can be established through 800 number services. Cellular telephony also now includes systems that include Global Positioning System (GPS) navigation that utilizes satellite navigation. These devices thus unite cellular phone technology with navigation information, computer information transmission and receipt of data.

The method and operation of communication devices used herein are described in U.S. Pat. No. 7,031,728 which is hereby incorporated by reference and pending U.S. patent application Ser. No. 11/308,648.

It would be advantageous to provide a communication network with a plurality of cell phones wherein polling could be performed by one or more users to find other remote cell phone participants that share a common interest or common relationship for interactive communication.

SUMMARY OF THE INVENTION

Applicant's communication system and method described herein is embodied in the advanced communication software (ACS) application programs developed by applicant and installed in the integrated PDA/GPS cell phones used herein.

A plurality of cellular phone/PDA/GPS devices each having ACS application programs and databases provides a communication network in conjunction with a remote server with the ability to: a) selectively poll each of the other PDA/GPS phone devices with each participant to start reporting its position and status information to all or selected users equipped with the same cellular phone/PDA software devices in the communications net so that each of the devices exchange location, status and other information, (b) display information by touching the display screen at remote phone's location on the PDA display, (c) make calls to or send data to remote phones by touching their display symbol and selecting the appropriate soft switch; (d) layer a sufficient number of switches or buttons on the PDA display to perform the above functions without overlaying the map; and (e) to allow a polling mode in each cell phone that allows a user to contact other cell phone users that have a common interest or relationship for communication.

A communication server acts as a forwarder for IP communications between any combination of cell phone/PDA users and/or PC based users. Network participant location, identity and status messages are sent to the server by each user. Network participant entered tracks are also sent to the server. Because this data is of interest to all the network participants, the server forwards the data received from one participant to all other participants, thus providing the information necessary for all network participants to know the identity, location and status of all other network participants.

The server also acts as a forwarder of data addressed from one participant to one or more addressed participants, thus permitting the transmission of free text, preformatted messages, photographs, video, E-mail and URL data from one network participant to other selected network participants.

The above functions can also be accomplished using peer to peer WiFi, WiMax or other peer to peer communications. However, for use with cellular communications and to assure the level of security that cell phone companies require, a centralized static IP routable server is used.

The IP server also fills another role of being a database from which data can be requested by network participants (i.e. maps, satellite images, etc.) or can be pushed to network participants (i.e. symbology and soft switch changes, etc.).

It is an object of this invention is to enable each participant in the communications net to poll the other net participants to find other cell phone users having a common interest or relationship.

Another object of this invention is to enable each participant in the communications net to be able to easily transmit an entity of interest to the other participants of the net by touching the display screen at the entity's location on the map, selecting the soft switch representative of the entity's identity, causing the symbol's location and identity to be transmitted on the network.

In accordance with these and other objects which will become apparent hereinafter, the instant invention will now be described with particular reference to the accompanying drawings.

BRIEF DESCRIPTION OF THE DRAWINGS

FIG. 3b is a continuation of the flow chart begun in FIG. 3a.

PREFERRED EMBODIMENT OF THE INVENTION

A method and communication system that joins a communications network of participants using handheld cell phones having integrated PDA and GPS circuitry with ACS application programs that allow a participant having an Advanced Communications Software (ACS) equipped cell phone to activate and control other participants' remote cell phones/PDAs that contain ACS.

A communication server acts as a forwarder for IP communications between any combination of cell phone/PDA users and/or PC based user. Network participant location, identity and status messages are sent to the server by each user. Network participant entered tracks are also sent to the server. Because this data is of interest to all the network participants, the server forwards the data received from one participant to all other participants, thus providing the information necessary for all network participants to know the identity, location and status of all other network participants.

The server also acts as a forwarder of data addressed from one participant to one or more addressed participants, thus permitting the transmission of free text, preformatted messages, photographs, video, E-mail and IRL data from one network participant to other selected network participants.

Figure 1:
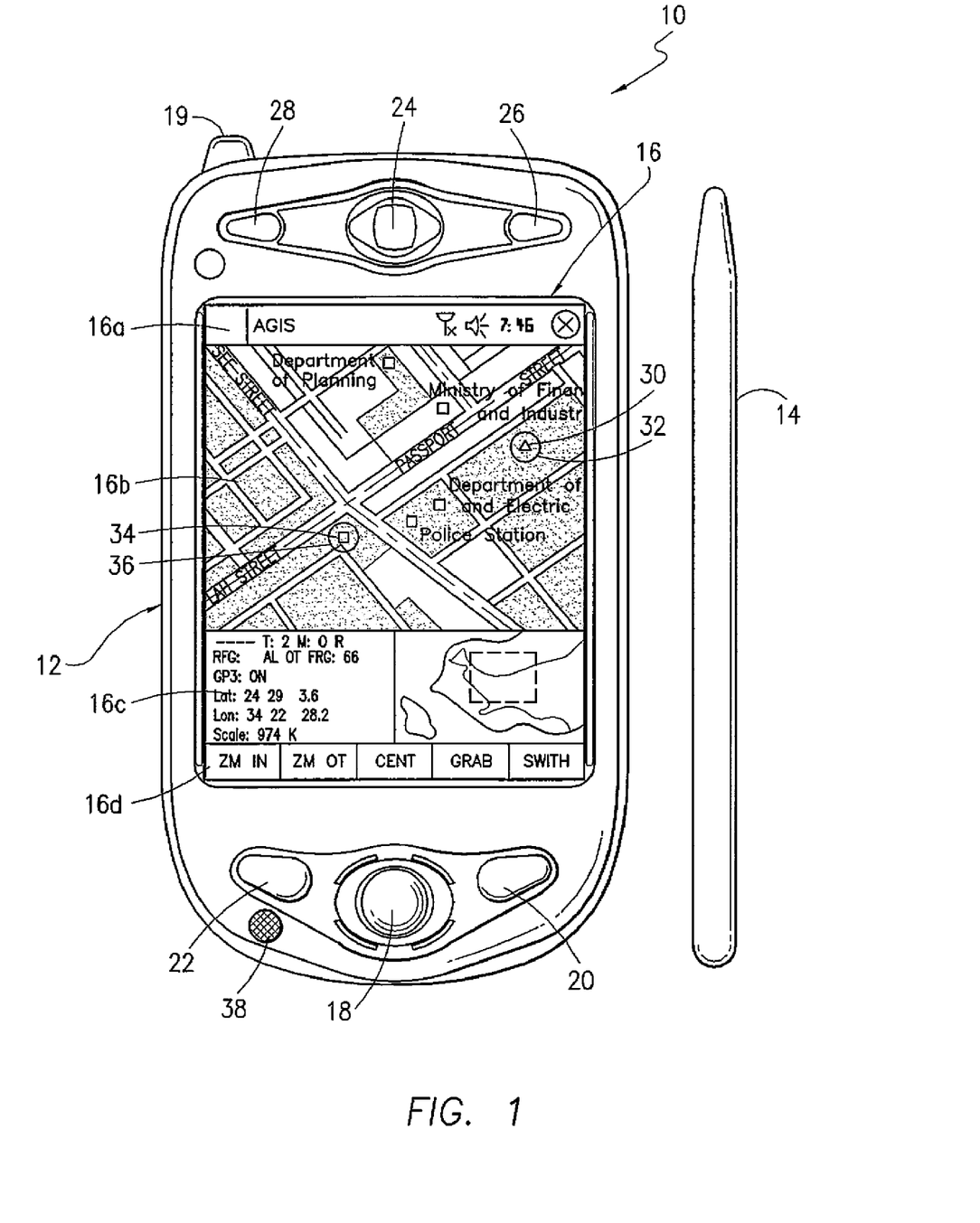
FIG. 1 shows a front plan view of a cellular phone/PDA/GPS having a touch screen.

Referring now to the drawings and, in particular, FIG. 1, a small handheld cellular phone 10 is shown that includes a personal digital assistant (PDA) and a global positioning system receiver (GPS) communications device integrated in housing 12 that includes an on/off power switch 19, a microphone 38, and an LCD display 16 that is also a touch screen system. The small area 16a is the navigation bar that depicts the telephone, GPS and other status data and the active software. Each cell phone includes a CPU and databases that store information useful in the communication network. The CPU also includes a symbol generator for creating touch screen display symbols discussed herein. With the touch screen 16, the screen symbols are entered through GPS inputs or by the operator using a stylus 14 (or operator finger) by manipulatively directing the stylus 14 to literally touch display 16. The soft switches 16d displayed on the display 16 are likewise activated by using a stylus 14 and physically and manipulatively directing the stylus to literally touch display 16. The display x, y coordinates of the touched point are known by a CPU in the PDA section of the communication system in housing 12 that can coordinate various information contained in the PDA relative to the x, y coordinate position on the display 16. Inside housing 12 is contained the conventional cellular phone elements including a modem, a CPU for use with a PDA and associated circuitry connected to speaker 24 and microphone 38. A GPS navigational receiver that receives signals from satellites that can determine the latitude and longitude of the cellular phone housing 12 can be internal or external to the housing 12. Conventional PDA/cellular phones are currently on sale and sold as a unit (or with an external connected GPS) that can be used for cellular telephone calls and sending cellular SMS and TCP/IP or other messages using the PDA's display 16 and computer (CPU). The GPS system including a receiver in housing 12 is capable of determining the latitude and longitude and through SMS, TCP/IP, WiFi or other digital messaging software, to also transmit this latitude and longitude information of housing 12 to other cellular phones in the communication network via cellular communications, WiFi or radio. The device 10 includes a pair of cellular phone hardware activating buttons 20 to turn the cellular phone on and 22 to turn the cellular phone off. Navigation pad actuator 18 is similar to a joy or force stick in that the actuator 18 manually provides movement commands that can be used by the PDA's software to move a cursor on display 16. Switches 26 and 28 are designed to quickly select an operator specified network software program. Speaker 24 and microphone 38 are used for audio messages. Switch 19 at the top left of device 10 is the power on and power off switch for the entire device.

The heart of the invention lies in the applicant's ACS application programs provided in the device. The ACS programs are activated by clicking on an icon on the display to turn the ACS programs on or off. Mounted within housing 12 as part of the PDA is the display 16 and the CPU. The internal CPU includes databases and software application programs that provide for a geographical map and georeferenced entities that are shown as display portion 16b that includes as part of the display various areas of interest in the particular local map section.

When looking at display 16, the software switches (soft switches) which appear at the very bottom of the display 16d are used to control by touch many of the software driven functions of the cellular phone and PDA. The soft switches are activated through the operator's use of the navigation pad 18, or a small track ball, force stick or similar hardware display cursor pointing device. Alternatively, the operator may choose to activate the software switches by touching the screen with a stylus 14 (or finger) at the switches' 16d locations. When some of the software switches are activated, different software switches appear. The bar display 16d shows the software switches "ZM IN (zoom in)," "ZM OT (zoom out)," "CENT (center)" and "GRAB (pan/grab)" at the bottom of the screen. These software switches enable the operator to perform these functions. The "SWITH (switch)" software switch at the lower right causes a matrix of layered software switches (soft switches) to appear above the bottom row of switches. Through use of the software switches, the operator can also manipulate the geographical map 16b or chart display. When looking at FIG. 1, display symbols depict permanent geographical locations and buildings are shown. For example, the police station is shown and, when the symbol is touched by the stylus or finger, the latitude and longitude of the symbol's location, as shown in display section 16c, is displayed at the bottom left of the screen. The bottom night side of display 16c is a multifunction inset area that can contain a variety of information including: a) a list of the communication link participants; b) a list of received messages; c) a map, aerial photograph or satellite image with an indication of the zoom and offset location of the main map display, which is indicated by a square that depicts the area actually displayed in the main geographical screen 16b; d) applicable status information; and e) a list of the communication net participants. Each participant user would have a device 10 shown in FIG. 1.

Also shown on the display screen 16, specifically the geographical display 16b, is a pair of different looking symbols 30 and 34, a small triangle and a small square, which are not labeled. These symbols 30 and 34 can represent communication net participants having cellular phones in the displayed geographical area that are part of the overall cellular phone communications net, each participant having the same device 10 used. The latitude and longitude of symbol 30 is associated within a database with a specific cell phone number and, if available, its IP address and email address. The screen display 16b, which is a touch screen, provides x and y coordinates of the screen 16b to the CPU's software from a map in a geographical database. The software has an algorithm that relates the x and y coordinates to latitude and longitude and can access a communications net participant's symbol or a fixed or movable entity's symbol as being the one closest to that point.

In order to initiate a telephone call to the cellular phone user (communication net participant) represented by symbol (triangle) 30 at a specific latitude and longitude display on chart 16b, the operator touches the triangle 30 symbol with the stylus 14. The operator then touches a "call" software switch from a matrix of displayed soft switches that would overlay the display area 16c. Immediately, the cellular phone will initiate a cellular telephone call to the cellular phone user at the geographical location shown that represents symbol 30. A second cellular phone user (communication net participant) is represented by symbol 34 which is a small square (but could be any shape or icon) to represent an individual cellular phone device in the display area. The ring 32 around symbol 30 indicates that the symbol 30 has been touched and that a telephone call can be initiated by touching the soft switch that says "call." When this is done the telephone call is initiated. Other types of symbolic elements on the display 16 can indicate that a cellular phone call is in effect. Additionally, the operator can touch both symbol 34 and symbol 30 and can activate a conference call between the two cellular phones and users represented by symbols 30 and 34. Again, a symbolic ring around symbol 34 indicates that a call has been initiated.

Equally important, a user can call the police station or any other specific geographical facility displayed on the map, including: buildings, locations of people, vehicles, facilities, restaurants, etc., whose cellular phone numbers and, if available, E-mail addresses, W addresses and their URLs (previously stored in the database) by touching a specific facility location on the map display using the stylus 14 and then touching the cellular phone call switch. As an example, the operator can touch and point to call a restaurant using a soft switch by touching the restaurant location with a stylus and then touching the call soft switch. The cellular phone will then call the restaurant. Thus, using the present invention, each participant can touch and point to call to one or more other net participants symbolically displayed on the map, each of whom has a device as shown in FIG. 1 and can also point to call facilities that had been previously stored in the phone's database. Furthermore, this symbol hooking and soft switch technique can be used to go to a fixed facility's website or to automatically enter the fixed facility's E-mail address in an e-mail.

Each cellular phone/PDA/GPS user device is identified on the map display of the other participant user phone devices by a display symbol that is generated on each user phone display to indicate each user's identity. Each symbol is placed at the correct geographical location on the user display and is correlated with the map on the display. The operator of each cellular phone/PDA/GPS device may also enter one or more other fixed entities (buildings, facilities, restaurants, police stations, etc.) and geo-referenced events such as fires, accidents, etc. into its database. This information can be likewise transmitted to all the other participants on the communications net. The map, fixed entities, events and cellular phone/PDA/GPS device communication net participants' latitude and longitude information is related to the "x" and "y" location on the touch screen display map by a mathematical correlation algorithm.

When the cellular phone/PDA/GPS device user uses a stylus or finger to touch one or more of the symbols or a location displayed on the cellular phone map display, the system's software causes the status and latitude and longitude information concerning that symbol or location to be displayed. In order to hook a symbol or "track" such as another net participant which represents an entity on the geo-referenced map display, or a fixed geographical entity such as a restaurant, police station or a new entity observed by a cell phone user which is discussed below, the operator points at or near the location of a geo-referenced symbol appearing on the cellular phone/PDA display that represents a specific track or specific participant or other entity. The hook application software determines that the stylus is pointed close to or at the location of the symbol and puts a circle, square or other indication around the symbol indicating that amplification information concerning the symbol is to be displayed and indicating that additional data or change in data can be made to the indicated symbol. The hook application code then sends a message to the display application code to display the net participant, facility or entity's amplifying data. The display application code retrieves the primary data and amplification data concerning the symbol or entity from the database and displays the information at the correct screen location. The operator can then read the amplification data that relates to that specific symbol at the specific location. The cell phone operator can also select soft switches on the touch screen display to change the primary data and amplification data. Furthermore, the operator can use a similar method of hooking and selecting to activate particular soft switches to take other actions which could include: making cellular phone calls, conference calls, 800 number calls; sending a free text message, operator selected preformatted messages, photographs or videos to the hooked symbol; or to drop a entered symbol.

Each known net participant has a cellular phone number, IP address and, if available E-mail address that is stored in each participant's device database.

To use the communication system, a user starts the PDA/cellular phone device system by turning on the cell phone power and selecting the cell phone and network software which causes: a) the cellular phone to be activated (if it has not already been activated); b) the GPS interface receiver to be established; c) a map of the geographic area where the operator is located and operator's own emit symbol to appear at the correct latitude and longitude on the map on the display; d) the locations of fixed facilities such as restaurants, hotels, fire departments, police stations, and military barracks, that are part of the database to appear as symbols on the map; e) the device selected item read out area which provides amplification information for the communications net participants or the entity that has been hooked (on the display screen) to appear on the display; f) an insert area that contains various data including: the list of net participants, a list of messages to be read, an indication of what portion of the map is being displayed in major map area and other information to appear on the display; and g) a row of primary software created "soft switches" that are always present on the display to appear.

For point to call network units and fixed facilities, the application code detects the x, y display screen location of the symbol that is designated by the user's stylus and translates the x, y coordinates to latitude and longitude and then: (1) searches the database to find the symbol at that location, (2) places a "hook" indicator (a circle, square or other shape) around the symbol, (3) displays any amplifying data and (4) obtains the symbol's associated phone number (or for VoIP calls an IP address) from the database. Upon receiving a "call" designation from the soft switch, the operator's device's ACS causes the appropriate phone number or IP number to be called. Upon receiving an indication that the phone number is being called, the application code places a box around the symbol (color, dashed or the like). When the call is connected, the box changes to indicate that the connection is made. When the other party hangs up, the box disappears.

As each of the cell phone participants reports its identity, location and status to the other participants' devices, the received data is geo-referenced and filed in their databases that are accessible by identity and by location. This data is then displayed on each cell phone display. When a request for data is received by touching the display screen, a location search is made by the ACS and a symbol modifier (circle, square, etc.) is generated around the symbol closest to the x, y position of the stylus. When the application code receives a soft switch command to place a phone call or send data, the software uses the phone number (or IP address) associated with the unit to place the call or to send data.

If a cell phone device receives a digital message that a call is being received, the receiving cell phone's ACS application code places a box or similar object around the transmitter symbol indicating who the call is from. When the call is answered, the application software changes the visual characteristics of the box. In a similar manner, when a phone receives a digital text message, photograph or video, a box appears around the transmitter's symbol indicating the transmitter of the message. The point to call network devices are participants and each one has a similar device with the same software for use as a total participant network. Other situations for calling facilities that are not part of the network are described below.

Thus, a user is capable of initiating a cellular phone call by touch only, and initiating conference calls by touching the geo-referenced map symbols. Furthermore, by using a similar symbol touching technique, a cellular phone can send user selected messages to cause a remote cellular phone to display and optionally announce emergency and other messages and to optionally elicit a response from the remote cellular phone.

All of the network participants have the same communication cell phone/PDA/GPS device described herein. The method and system include the ability of a specific user to provide polling in which other cellular phones, using SMS, internet or WiFi, report periodically based on criteria such as time, speed, distance traveled, or a combination of a time, speed and distance traveled. A user can manually poll any or all other cell phone devices that are used by all of the participants in the communication network having the same devices. The receiving cellular phone application code responds to the polling command with the receiving cellular phone's location and status which could include battery level, GPS status, signal strength and entered track data. Optionally, the phone operators can set their phones to report automatically, based on time or distance traveled intervals or another criterion.

The soft switch application software causes a visual display of a matrix such as five across by six up (or another matrix) in which switch names are placed on the cellular/PDA display. The soft switch network application software knows the touch screen location of each of the switches in the matrix and the software routines that will be activated upon touching the switch.

The bottom row of soft switches displayed on the touch screen remains visually fixed. These switches concern the functions that are the most often used. One of the switches causes a matrix of other soft switches to appear above the visually fixed soft switches. These switches are function soft switches, the activation of any one of which causes a different matrix of soft switches to appear, which are known as the action soft switches. When the action soft switches appear, the function soft switch, which caused the action soft switches to appear, itself appears as a label in the lower left (or some other standard location) indicating to the operator the faction soft switch that has been selected. When the operator selects an action soft switch, the appropriate application software to accomplish the action is activated.

Upon receiving a soft switch activation message, the ACS accesses the appropriate task execution software which accomplishes the required tasks including: entry of track data, entry of track amplification data, transmission of alpha/numeric messages, photographs, videos, display of messages to be read, selection of map types, placing voice calls, placing conference calls and 800 conference calls, presenting different potential operator selections, control of the display actions, polling network participants, establishing nets of participants (groups) so that communications with all in the group can be accomplished with a single soft switch action, and dropping a previously entered track. By providing a matrix and layers of soft switches which are easily manipulated by a stylus, each cell phone device in the communication network is extremely efficient in accessing and coordinating the appropriate application program for the device to perform.

Figure 2A:
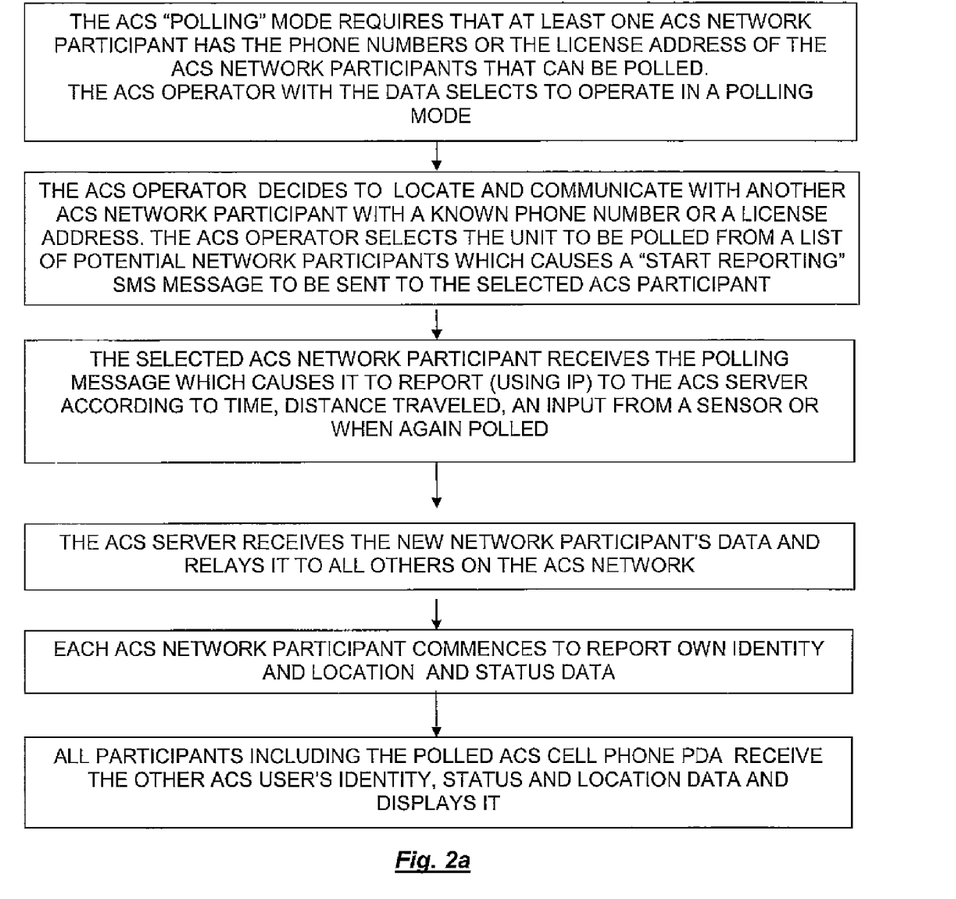
FIG. 2a shows a flow chart of a method for providing a polling network among the network's identification, location and status reporting participants.

Referring now to FIGS. 2a through 2d, there are several ways that the network can be configured for participant inclusion into a network where all in the network have a cell phone PDA and advanced communications software (ACS) including:

FIG. 2a POLLING. To initialize the communications net, a user selects, from a list, the other users (or all of them), that the user desires to be part of the communications net. The user then "polls" the selected phones to activate by sending a poll message to the server which then relays it to the recipient to become part of the communications net. The polled cell phone then transmit its GPS or entered location and status to all the other phones in the established net. The other established net participants to report their location identity and status information to the polled phone. Through interaction with one or more other ACS enabled cellular phones, symbols are generated on the operators' displays based on the participants' latitude and longitude that is exchanged between the cellular phones. The transmission of this information is based on an algorithm, which considers time and/or movement, or which is based upon a polling request.

FIG. 2a shows a flow chart of a method for providing a polling network among the network's identification, location, status reporting participants. The ACS "polling" mode requires that at least one ACS network participant has the phone numbers or the license address of the ACS network participants who can be polled. The ACS user with the data selects to operate in a polling mode. The ACS user decides to locate and communicate with another ACS network participant with a known phone number or a license address. The ACS user operator selects the unit to be polled from a list of potential network participant(s) which causes a "start reporting" SMS message to be sent to the selected unit. The selected ACS network participant receives the polling message which causes it to report to the IP server according to time, distance traveled, an input from a sensor or when polled. The server receives the new network participant's data and relays it to all others on the ACS network. Each ACS network participant who has been previously polled then commences to report its identity and location and status data through the server to the new network participant. Each ACS cell phone PDA receives the other ACS user's identity, status and location data and displays it.

Figure 2B:
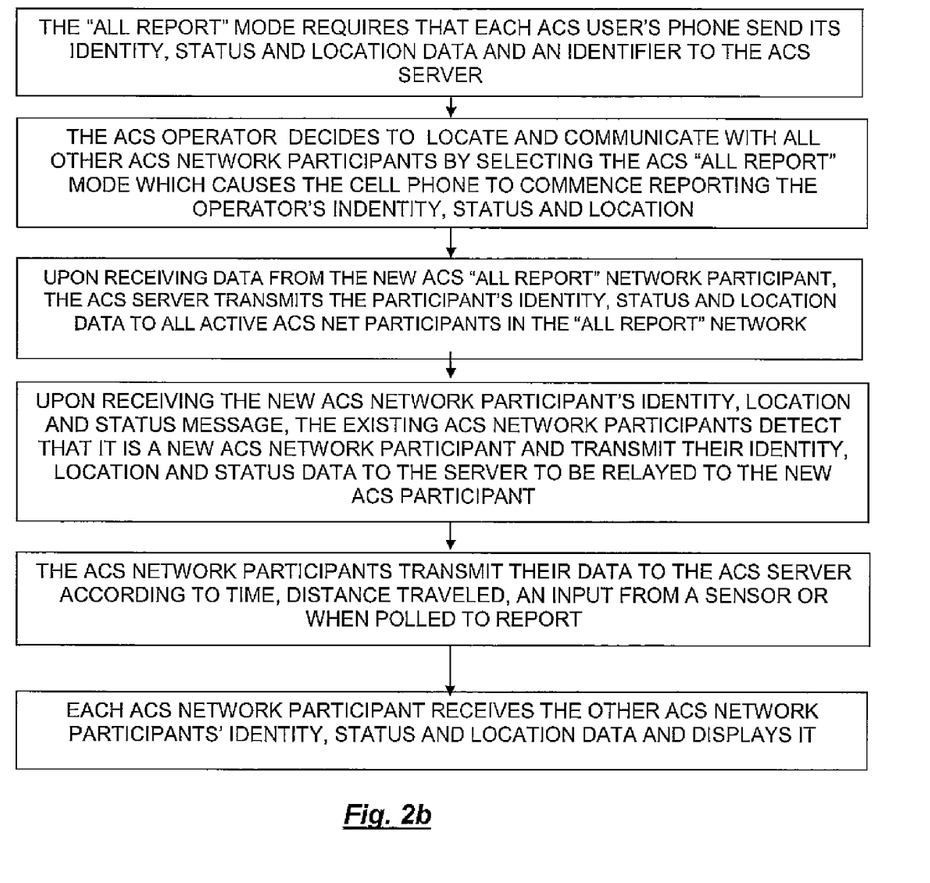
FIG. 2b shows a flow chart of a method that provides an all report network among the network's identification, location and status reporting participants.

FIG. 2b shows a flow chart of a method that provides an "all report" network among the network's identification, location, status reporting participants.

The "all report" mode requires that each ACS user's phone send its identity, status and location data and an identifier to the server. Upon receiving data from the new ACS "all report" network participant, the server transmits the participant's identity, status and location data to all active ACS net participants in the "all report" network. Upon receiving the new ACS network participant's identity, location and status message, the existing ACS network participants detect that it is a new ACS network participant and transmit their identity, location and status data to the server to be relayed to the new ACS participant. ACS program participants transmit their data to the server according to time, distance traveled, or an input from a sensor or when polled. Each ACS network participant receives the other ACS network participant's identity, status and location data and displays it.

Figure 2C:
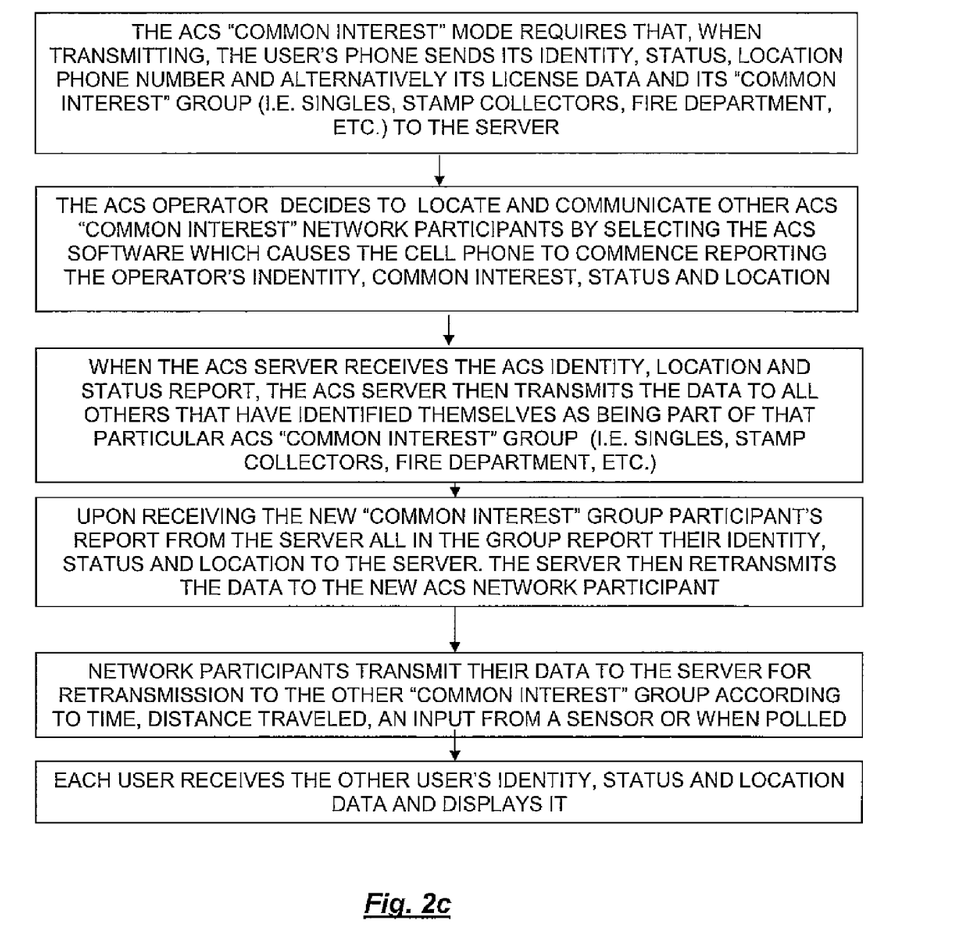
FIG. 2c shows a flow chart of a method that provides a common interest network among the network's identification, location and status reporting participants.

FIG. 2c shows a flow chart of a method that provides a "common interest" network among the network's identification, location, and status reporting participants. The ACS "common interest" mode requires that, when transmitting, the user's phone sends its identity, status, location phone number and, alternatively, its license data and its interest group (singles, stamp collectors, fire department, etc.) to the server. When the server receives the ACS identity, location and status report, the server then transmits the data to all others who have identified themselves as being part of that particular ACS "interest group" (singles, stamp collectors, fire department, etc.). Upon receiving the new group participant's report from the server, all in the group report their data to the server. The server retransmits the data to the new ACS network participant. Network participants transmit their data to the server according to time, distance traveled, an input from a sensor or when polled. Each user receives the other user's identity, status and location data and displays it.

Figure 2D:
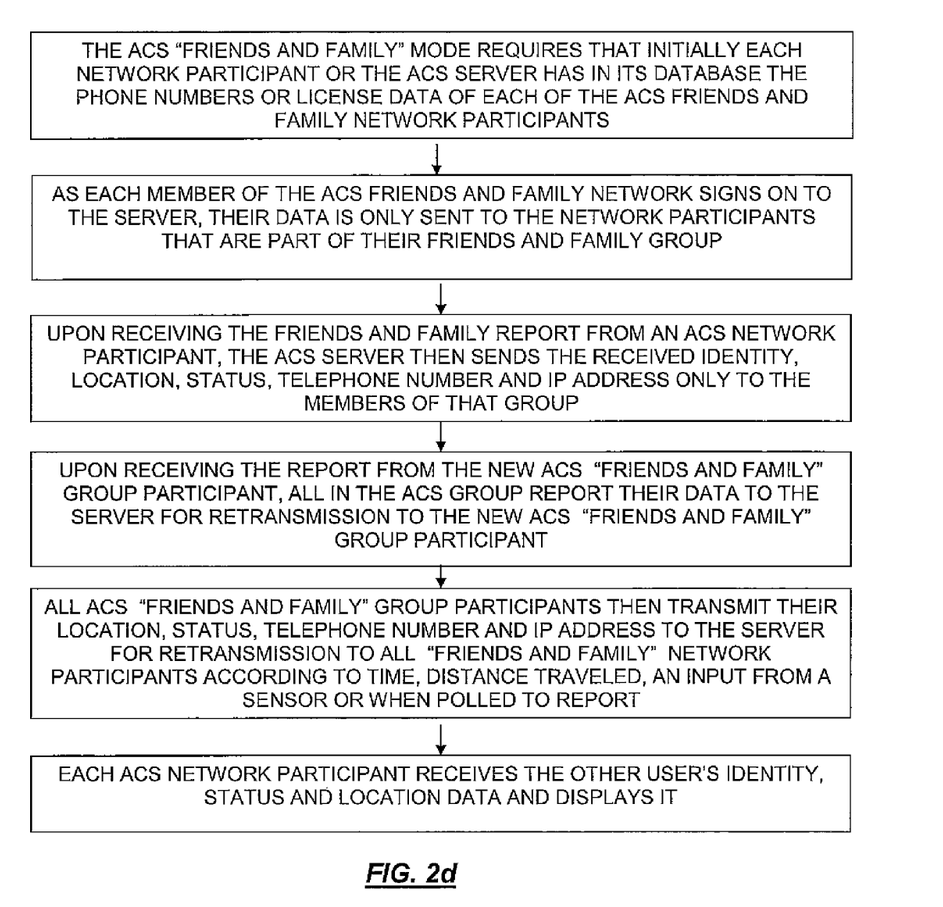
FIG. 2d shows a flow chart of a method that provides a friends and family network among the network's identification, location and status reporting participants.

FIG. 2d shows a flow chart of a method that provides a "friends and family" network among the network's identification, location, and status reporting participants. The ACS "friends and family" mode requires that initially each network participant or the server has in its database the phone numbers or license data of each of the ACS "friends and family" network participants. As each member of the ACS "friends and family" network sign on to the server, its data is only sent to the network participants that are part of its friends and family group. Upon receiving the friends and family report from an ACS network participant, the server determines which ACS friends and family group the report is from and then sends the received identity, location, status, telephone number and IP address only to the members of that group. Upon receiving the report from the new ACS group participant, all in the ACS group report their data to the server addressed to the new ACS group participant. ACS network participants transmit their data to the server addressed to all friends and family ACS network participants according to time, distance traveled, an input from a sensor or when polled. Each ACS network participant receives the other user's identity, status and location data and displays it.

Figure 3A:
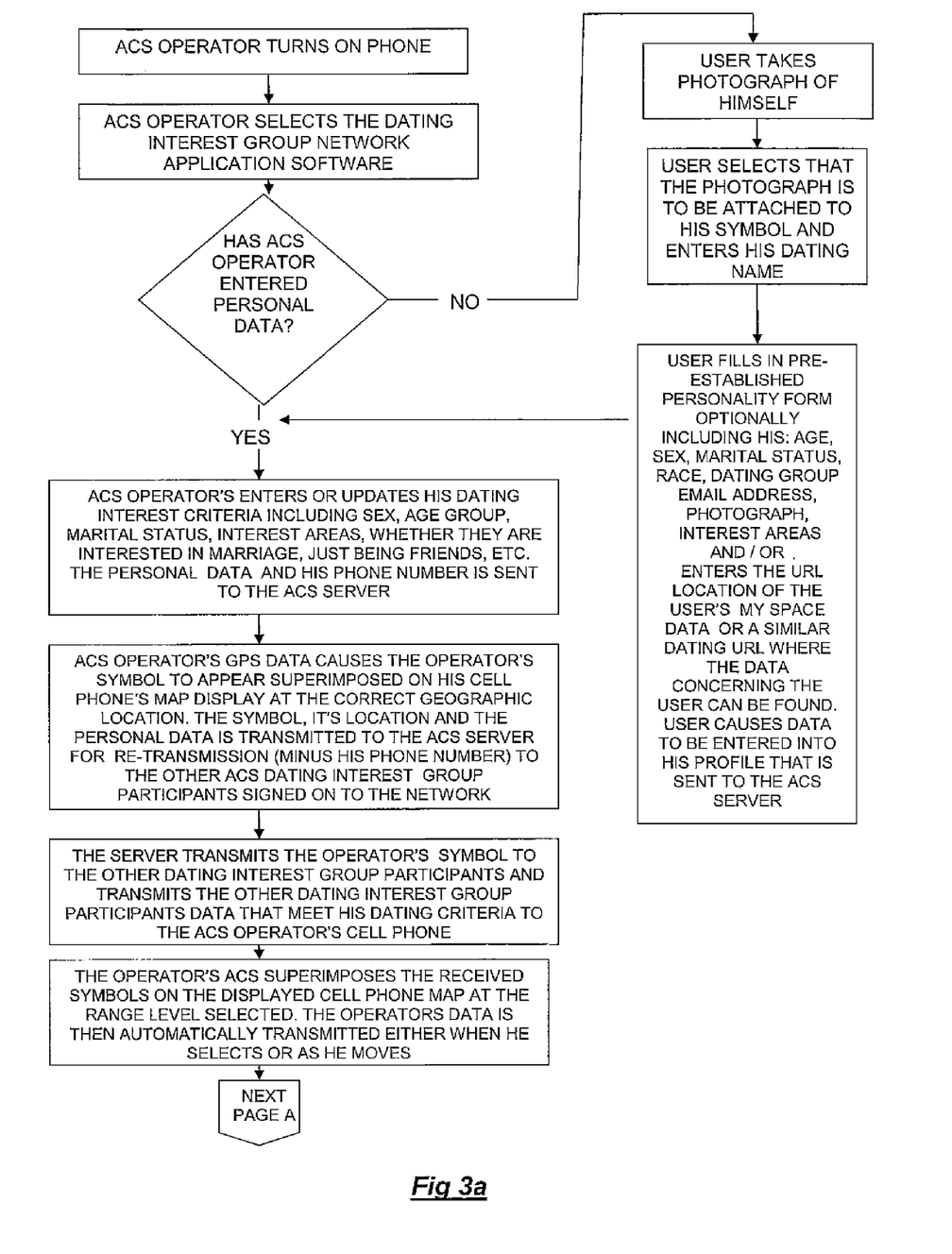
FIG. 3a shows the first segment of a flow chart that allows interested parties to contact other people for dating or social interaction purposes using the present invention.

Referring now to FIG. 3a, the user participant network, and particularly the cell phone, can also be used as a dating network to establish social relationships with strangers. The process can involve contacting other network participants who have chosen through the ACS to participate in a cell phone network social/dating interactive communication network. FIG. 3a describes the social/dating network. The ACS operator has a cell phone/PDA/GPS unit equipped with specific ACS software for the social dating interaction and to begin would turn on his or her phone and select the ACS dating service. At that point, the dating interest group network application software is activated on the operator's cell phone. If this is the first time the operator has selected the dating ACS, a menu will come up that asks the ACS operator to enter personal data. The operator can take a photograph of himself or herself and specify that the photograph is to be attached to the operator's display symbol. The operator also enters his or her phone number (used by the server) if not available to the ACS and dating network name. At this point, the operator is prompted to fill in a pre-established personality information form on his or her cell phone display that includes, among other things, age group, sex, race, marital status, interest area, etc., each of which can have a preassigned symbol type and color. The operator can also enter his or her dating group B-mail address and the URL associated with his or her Myspace or similar web dating URL. When the operator's personal data entry has been entered, he or she is prompted to enter his or her dating interest criteria including sex, age group, race, marital status, interest area, etc.

Once the ACS operator has completed entering the dating criteria, the cell phone's GPS's output data causes the operator's symbol to appear superimposed on a map at the correct latitude and longitude. The symbol, associated photograph, and entered personal information is transmitted to the ACS server from which it is retransmitted (minus the phone number) to other ACS dating interest group participants who have signed onto the network through the ACS dating software. The operator's symbol which can be indicative of his or her sex, age group, race, etc., then appears on the other dating group displays. The server then transmits the other dating interest group participants, their associated photographs and entered personal information to the ACS operator. The operator's dating ACS superimposes the received symbols on the displayed map.

Figure 3B:
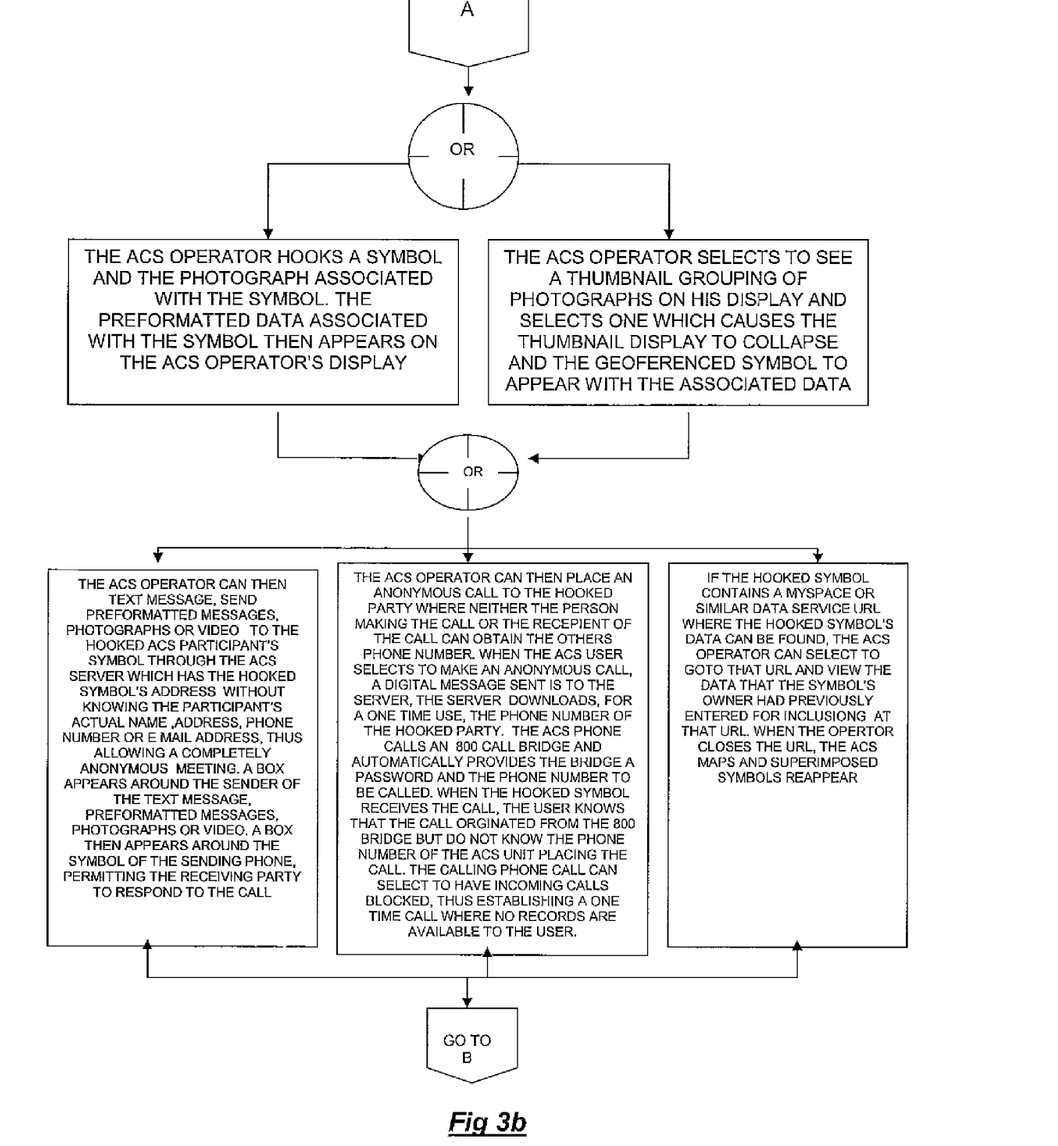

Referring now to FIG. 3b, which is a continuation of the flow chart from FIG. 3a, the dating criteria is used by the operator's ACS to display dating symbols that correspond to the operator's entered dating criteria The ACS cell phone operator can then either: (a) hook a displayed symbol which causes the photograph and the pre-formatted data associated with the symbol to appear on the ACS operator's display or (b) select to display a thumb nail grouping of photographs of symbols in his or her vicinity that meet his or her criteria. The ACS operator can then select a thumb nail photograph of the person that he or she desires to view as a large photograph, by touching it on the display. If the ACS operator then desires to see the location of the person associated with the photograph, he or she selects a soft switch that is drawn on the display, which causes the photograph to collapse and the geo-reference symbol associated with the photograph to appear on his or her display. The ACS operator can then either:

(a) send a free text message, a pre-formatted message, photographs or video to the hooked ACS participant symbol by pointing at or "hooking" the symbol which enables the operator's ACS to know how to address the data to the server. Since only the server knows the IP address of the symbol, the ACS operator can establish these communications without actually knowing the other network participant's actual name, address, phone number, E-mail or IP address, thus allowing for a completely anonymous exchange of data. When the data is sent to the addressee, the server also sends a symbol modifier that is associated with the sender. The symbol modifier causes a box or other indication to appear around the sender's symbol, thus permitting the receiving party to know to which symbol to respond to if that is their desired action.

(b) hook the symbol and select a voice call soft switch which automatically causes the cell phone to send a digital message to the server requesting the phone number of the hooked symbol. Upon receiving the message, the server digitally transmits the phone number to be called to the requesting phone's ACS which does not display the phone number to the operator but, rather, makes a call to a commercial 800 number call bridge and sends the bridge the billing password and the phone number to be called. The 800 bridge then calls the phone number of the hooked symbol. When the recipient answers the call, the 800 calling bridge number appears on the recipient's display and a box or other modifier then appears around the symbol of the calling phone, thus permitting establishment of anonymous voice communications where neither party knows the phone number of the other party while also permitting the recipient to know the caller's location and his entered personal data and enabling the recipient to selectively later respond by either returning the voice call or sending text messaging.

(c) select to view the hooked symbol's Myspace or similar dating service URL by hooking the symbol and selecting the access URL soft switch which causes the ACS to access the symbol's URL and to display the data associated with the URL. Upon closing the web site associated with the URL, the ACS map and associated superimposed map display again appears.

Figure 3C:
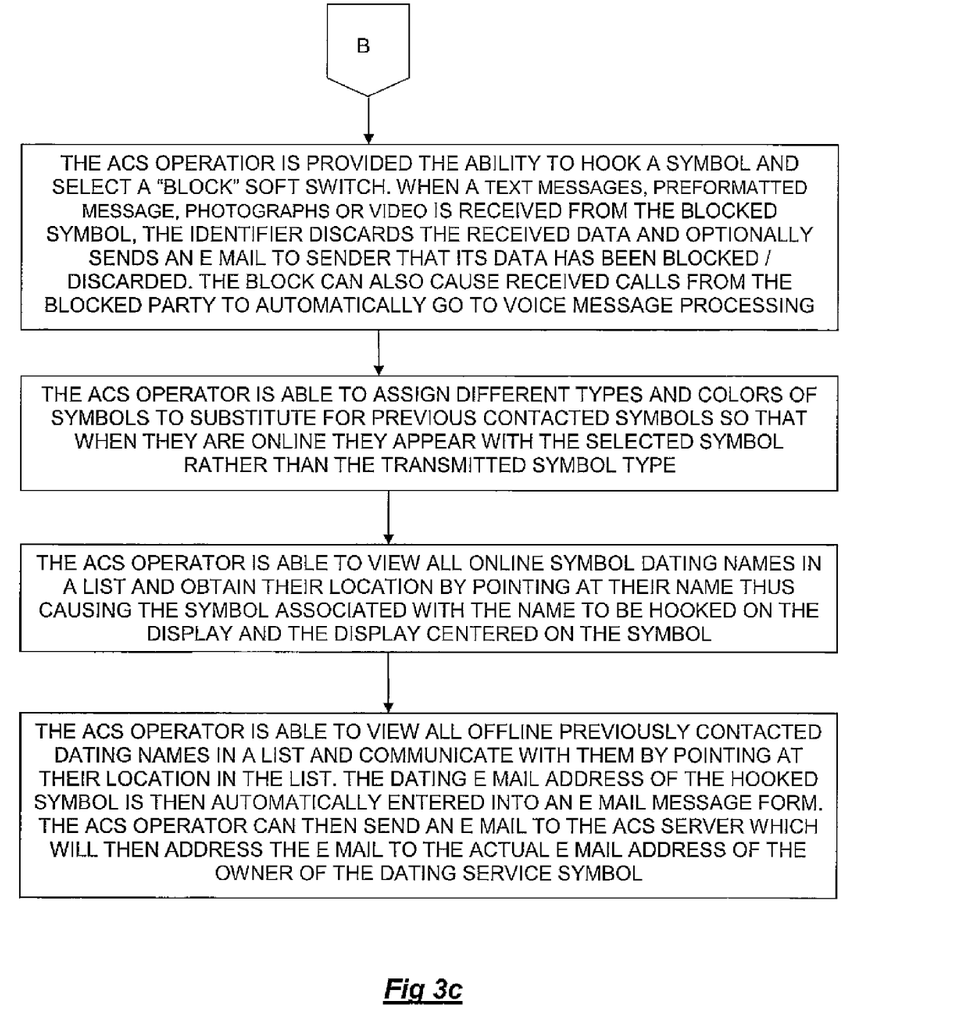
FIG. 3c is the termination portion of the flow chart begun in FIGS. 3a and 3b.

Referring now to FIG. 3c, the last portion of the flow chart begun in FIGS. 3a and 3b is shown. At this point, the ACS operator is provided the ability to hook a symbol and select a "block" soft switch. The block soft switch blocks free text message, pre-formatted message, photographs or video received from a particular symbol from being processed. When message traffic is received from the "blocked" symbol the operator's ACS discards the received data and optionally sends an E-mail to the sender that their data has been blocked or discarded. This is the rejection mode. Furthermore, the block command can cause a received voice call from the sender to go to the phone's voice message box in lieu of having to answer the call.

The ACS operator is able to assign different types and colors of symbols to substitute for previously contacted symbols so that when the previous contacted symbol is on-line the symbol would appear with a selected symbol type or color rather than the transmitted symbol type and color.

The ACS operator is able to view all online symbol dating network names in a list. The ACS operator can then select a name from the list by pointing at it which will cause the symbol associated with the name to be hooked on the display and the photograph (if available) and personnel data associated with the name to appear on the display.

Finally, the ACS operator is able to view a list of all previously contacted dating names that have responded to either his or her communications. The operator is then able to send an E mail to that dating name by touching the location of the name. This action will cause an E mail form to be filled in addressed to the dating name. When the ACS operator has created the E mail, it is sent to the ACS server which readdresses the E mail to the actual E mail address of the owner of the dating service name.

Thus, it can be seen that using a cell phone with specialized advanced communication software as described herein, a network of participants can individually communicate with each other or specific groups or types of people and can establish selectable anonymous relationships.

The instant invention has been shown and described herein in what is considered to be the most practical and preferred embodiment. It is recognized, however, that departures may be made there from within the scope of the invention and that obvious modifications will occur to a person skilled in the art.

What is claimed is:

1. A method of communicating among a group of participants each having a communication device that includes a touch display screen, a global positioning system, and advanced communications software, comprising the steps of:
   a. establishing, over a private remote server excluding a website or a web browser, a communications network among the communication devices whereby the participants are capable of exchanging and displaying identity data, location data, status data, and personal data through the advanced communications software;
   b. providing, over the communications network, at least one of the participants with the identity data of at least one of the other participants;
   c. establishing a polling network comprising at least one of the participants by selecting, through the advanced communications software, the identity data that includes a phone number corresponding to that participant;
   d. sending, through the advanced communications software, a SMS polling message to each of the participants of the polling network;
   e. in response to receiving the SMS polling message, the polled unit continuously and automatically transmitting according to a set time interval, distance traveled, or sensor input, at least its identity and location data to the private remote server using IP communications to the pre-stored server address contained in the ACS software;
   f. each time the polled participant's data is received, the private remote server transmitting to each of the other participant devices in IP communications with the server, at least the identity data and the location data of each of the participants, on the polling network, without any selection criteria or manual input of relationship data; and
   g. displaying, on the touch display screen of each communication device, at least the identity data and the location data of each of the participants of the polling network.

2. The method of claim 1, wherein the location data of the participant is generated by the global positioning system of the participant's communication device and is used to automatically report according to a set time interval and/or distance traveled.

3. The method of claim 1, wherein the location data of each of the participants of the polling network is displayed on the touch display screen as a geo-referenced symbol on a map.

4. A method of communicating among a group of participants each having a communication device that includes a touch display screen, a global positioning system, and advanced communications software, comprising the steps of:
   a. establishing, over a private remote server excluding a website or a web browser, a communications network among the communication devices whereby only the network participants with a common interest are capable of exchanging and displaying identity data, location data, status data using IP communications to the address contained in the ACS software ;
   b. each network participant automatically transmitting according to a set time interval, distance traveled, or sensor input, at least its identity and location data to the private remote server using IP communications and having a pre-stored address contained in the ACS software;

c. establishing, on the private remote server, a common interest network comprising every participant having common interest data matching the common interest data of the requesting participant;

d. each time network participant data is received the private remote server automatically transmitting to each of the other devices in IP communications with the server with the same common interest, at least the identity and, location data of each of the participants, in the common interest network without any selection criteria or manual input of relationship data; and e. displaying, on the touch display screen of each communication device of each participant in the common interest network, at least the identity data and the location data of each participant in the common interest network.

5. The method of claim 4, wherein the location data of the participant is generated by the global positioning system of the participant's communication device and is used to automatically report to the private remote server according to a set time interval and/or distance traveled.

6. The method of claim 4, wherein the location data of each of the participants of the common interest network is displayed on the touch display screen as a geo-referenced symbol on a map.

7. The method of claim 4, wherein the common interest data identifies a group of friends.

8. The method of claim 4, wherein the common interest data identifies a group of family members.

* * * * *